US006259676B1

United States Patent
Kellock et al.

(10) Patent No.: US 6,259,676 B1
(45) Date of Patent: Jul. 10, 2001

(54) UPGRADING OF SUBSCRIBER CONNECTION

(75) Inventors: Hamish Kellock; Arne Nylund, both of Espoo; Timo Norri, Helsinki, all of (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/098,565

(22) Filed: Jun. 17, 1998

(51) Int. Cl.$^7$ .................................................. H04L 12/26
(52) U.S. Cl. .............................................. 370/248; 379/27
(58) Field of Search ................................... 370/352, 354, 370/250, 360, 362, 522, 524, 401, 241, 248; 379/27

(56) References Cited

U.S. PATENT DOCUMENTS

| 4,451,708 |   | 5/1984  | Kemler et al. |         |
|-----------|---|---------|---------------|---------|
| 4,558,188 |   | 12/1985 | Stuparits et al. |      |
| 4,594,704 |   | 6/1986  | Olliver.      |         |
| 5,001,741 |   | 3/1991  | Sayer.        |         |
| 5,629,931 | * | 5/1997  | Kausel        | 370/241 |
| 5,636,202 | * | 6/1997  | Garney        | 370/241 |
| 6,014,374 | * | 1/2000  | Paneth        | 370/345 |
| 6,028,848 | * | 2/2000  | Bhatia        | 370/257 |

FOREIGN PATENT DOCUMENTS

WO 97/01938    1/1997  (WO).

* cited by examiner

Primary Examiner—Hassan Kizou
Assistant Examiner—Roberta Stevens
(74) Attorney, Agent, or Firm—Altera Law Group, LLC

(57) ABSTRACT

Upgrading of a subscriber connection to another requires an upgrading work done by an electrician. According to the invention, the type of connection is upgraded by remote control. A switch matrix bus including several parallel lines (1–8) is placed in the access node. Connected fixedly in advance to the bus are interface units of an ADSL connection and, when desired, of an ISDN connection, however, in such a way that only one interface is connected actively to one bus line at a time. A controlled switch element (SE1, SE2) connects a line coming from a test relay (R3) located between the end of the subscriber line (e.g. SL3) and its interface to the switch matrix bus instead of the test bus. With a remote control signal supplied through network management a choice is made of which test relay connects the connected subscriber line to the controlled switch element. Since the line or wire couple of the switch matrix bus for its part is connected fixedly to the interface of the ISDN or ADSL subscriber connection, this means that the subscriber line can be connected by way of the switch matrix bus to the ISDN or ADSL interface instead of the original analog interface, or the subscriber line may be connected to the ADSL interface instead of the original ISDN interface. In this way, any subscriber line may be upgraded to a connection of another type by remote control.

10 Claims, 4 Drawing Sheets

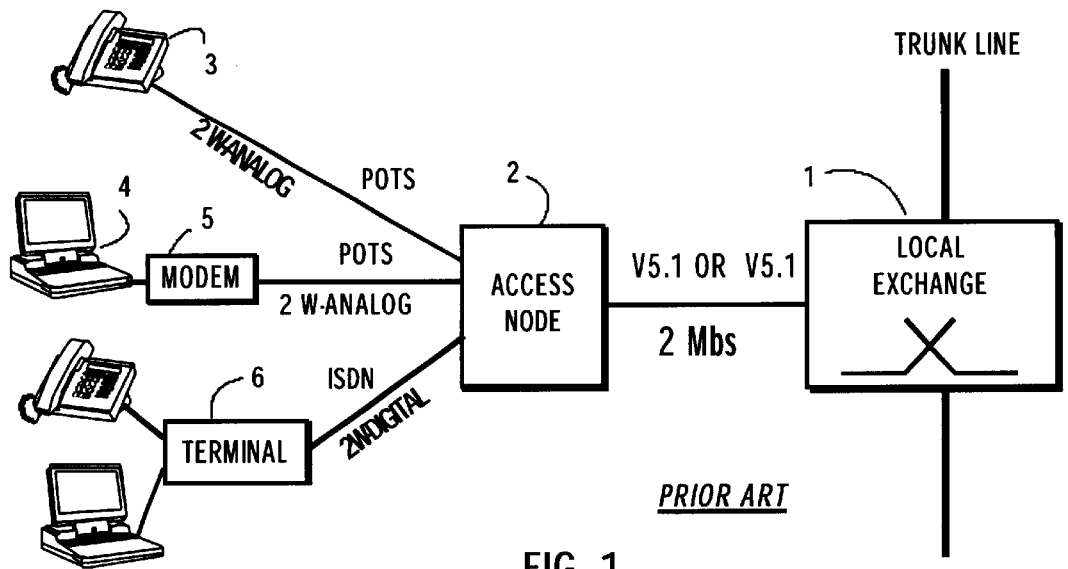
FIG. 1 *PRIOR ART*
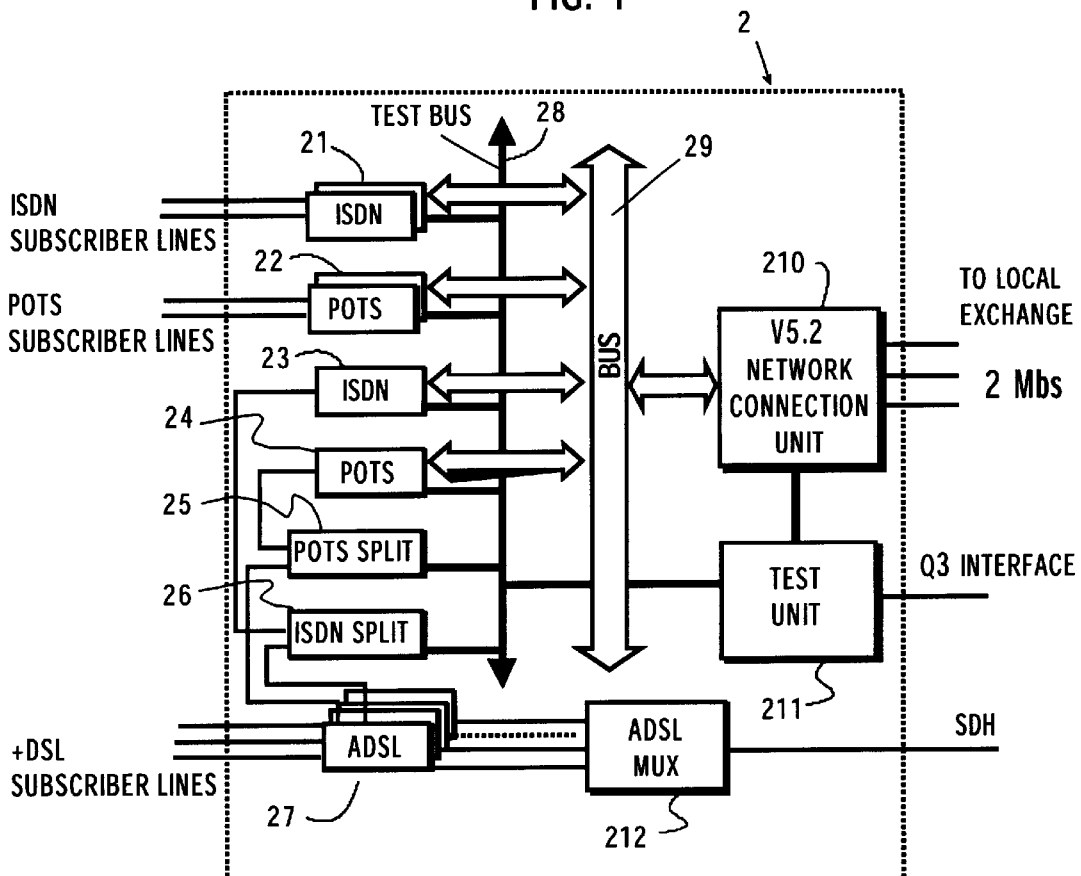
FIG. 2 *PRIOR ART*

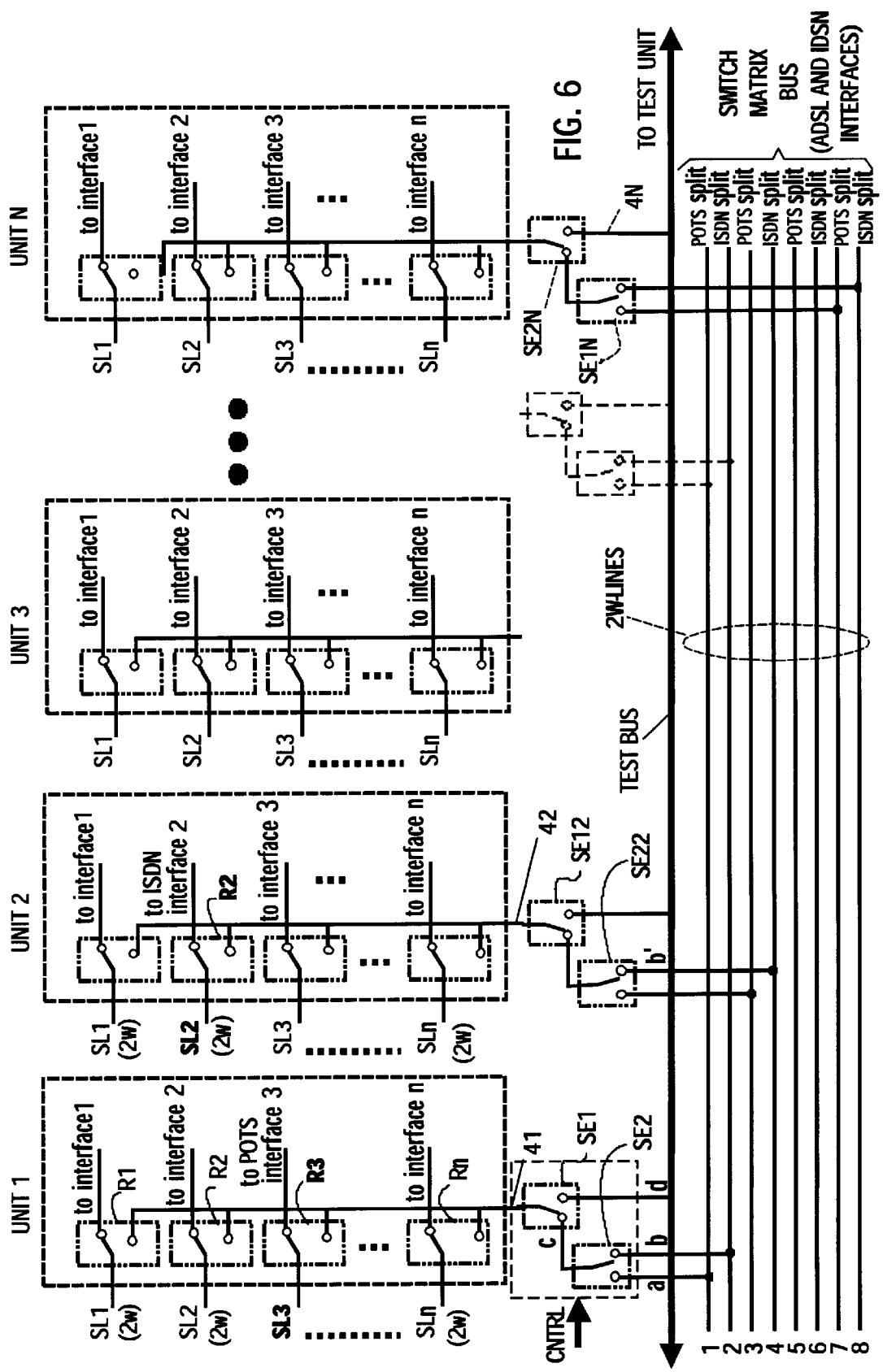

UPGRADING OF SUBSCRIBER CONNECTION

FIELD OF THE INVENTION

This invention concerns upgrading of the type of subscriber connection in a telephone network, wherein the subscriber connection may be an analog PSTN connection or a digital ISDN connection or any other digital connection.

BACKGROUND OF THE INVENTION

Until the 80s every subscriber was connected to the local telephone exchange by using a copper twin cable. From the subscribers wall socket the twin cable leads to a main distribution frame, where the individual twin cables coming from several different subscribers are connected to a thicker cable containing several wires. A set of such cables may then be connected to a cable which containing hundreds and even thousands of wires is located farther away in another main distribution frame and which leads to the telephone exchange. The subscriber lines thus form a star-like network, the cables of which are connected in the local exchange. For this reason, most cables of a telephone operator are formed by subscriber lines.

Along with the digitalisation of the telephone network, attempts have been made to extend the digital network to be as close to the subscriber as possible. This has resulted in a basic solution of the kind shown in FIG. 1. In this, the individual subscriber lines (that is, the copper twin cables) are connected with one network element functioning as an access node to the network. In the access node, an AD conversion of analog signals is performed, whereupon samples are multiplexed in a so-called subscriber multiplexer to a PCM line leading to the local exchange. For each subscriber line there is hereby a specific time slot on the trunk line. A concentrator may also be used instead of a multiplexer. On-hook/off-hook detection and loop measurements of subscriber lines are also performed in the access node.

The subscriber may have a plain old analog connection, a so-called POTS (Plain Old Telephone System) connection, whereby he may connect analog terminal equipment to a 2w subscriber line directly or by way of a piece of digital terminal equipment, such as a computer modem.

In the wake of the Internet's popularity, the need for quicker data transmission has grown, which is why there has been a strong increase lately in the number of ISDN connections. For upgrading a POTS connection to a basic speed ISDN connection relaying sound and data, an adapter card is required at the exchange end of the subscriber line and an ISDN terminal is required at the subscriber end. The basic speed connection is a so-called 2B+D including two 64 kbit/s channels B and one 9.6 kbit/s signal and control channel D. The physical transmission medium is still the same twin cable. The ISDN "modem" at the subscriber end is usually an AD converter, whereby a piece of analog terminal equipment may be connected to the modem. One channel B (the POTS channel) is hereby used for transmission of an audio frequency speech signal while the other channel B is used for data transmission. Channels B are two-way channels.

Using the same twin cable quite high data transmission rates may be achieved by using ADSL (Asymmetric Digital Subscriber Line) technology. ADSL includes three separate frequency channels on the same 2w twin cable. The lowest frequency channel transmits traditional POTS audio frequency calls. The second uplink channel transmits data at a rate of 16–500 kbit/s from the subscriber's terminal equipment over the subscriber line to the network. The third channel is a high-rate downlink channel which may be used e.g. for transmitting a film from the network to the consumer. Transmission rates may be in a range of 1.5 Mbit/s–9 Mbit/s. The subscriber needs an ADSL modem. In the prototype modem there are three connectors, one of which leads to the telephone wall socket, the second is a standard RJ-11 connector intended for analog terminal equipment and the third is an RJ45 connector of a twisted Ethernet couple to which the computer is connected. It is a great advantage of the ADSL that it uses no special adapter electronics for analog equipment, but the analog connection will work even if the ADSL modem proper does not. Due to the high frequency, the subscriber line may not be very long, so that when using a rate of 6 Mbit/s the line length may be 2.5–3 km.

FIG. 3 illustrates frequencies which may be used when using the transmission methods listed above. In a POTS connection the frequency range is 300 Hz–3.4 Khz, in an ISDN connection it is approximately 300 Hz 80 Khz. With a rate of 1.5 Mbit/s the ADSL will work at even higher frequencies and its uplink channel is in a range of 85–95 Khz, while the downlink channel is in a range of 110 –410 Khz. It is essential to notice from the figure that a traditional POTS connection, an ISDN connection, an ISDN connection where a POTS signal is transmitted on one channel, or simultaneously an ISDN and an ADSL connection or a POTS and an ADSL connection may be available to the subscriber. All this is achieved by using the traditional 2w copper cable.

FIG. 2 shows in greater detail circuits located in the access node. Physically, the access node may be located in a building or it may be a small cabinet on the street. The cabinet contains a rack including one or several frames. The frame includes plug-in units having circuit cards equipped with the necessary electric circuits. In the rear part of the frame there are backplane buses through which the plug-in units are connected electrically to one another. The individual subscriber lines leading to the access node all end at their own plug-in unit and in the subscriber line interface unit located therein, which adapts the subscriber line to the network interface. In FIG. 3 the subscriber lines of ISDN subscribers thus end in ISDN cards 21, which may contain several individual subscriber line interface units, that is, several subscriber lines end on the same card. Similarly, the lines of those who have analog connections end in subscriber line interface units performing POTS adapting on POTS cards 22.

POTS and ISDN plug-in units are connected to backplane bus 29, to which unit 210 performing the network connection is also connected. The interface to the local exchange is here a standard V5.2, and unit 210 connects the access node with the exchange over 2 Mbit/s trunk lines.

In addition, the access node also includes a test unit 211, which is connected to the network management system by way of a standard network management interface Q3. Test unit 211 is connected through a separate test bus 28 to the ISDN and POTS subscriber line interfaces 21 and 22. The test unit performs the conventional loop measurements of subscriber lines and supplies the results for use by the network management.

When subscribers find that their present POTS and ISDN connections are too slow for use on the Internet, they may require that the operator provide an ADSL connection offering a speed many times higher than the speed allowed by the ISDN connection. Such a need will occur by that time at the latest when more ADSL modems intended for the subscriber end of the subscriber line are commercially available. This is why the telecommunications operator may prepare himself for an introduction of ADSL technology by adding ADSL modems to the existing access node and by equipping new access nodes with these. FIG. 2 illustrates this situation. The figure shows a set of ADSL modems 27, to each of which a subscriber line can be connected. Besides the ADSL technology, preparations can be made for the VDSL (Very High Data Rate Digital Subscriber Line) technology or for the HDSL (High Bit Rate Digital Subscriber Line) technology using a 2 Mbit/s PCM line. Such preparation is referred to in FIG. 2 by the mark+DSL. ADSL no longer relies on 2 Mbit/s PCM lines, which is why the figure shows ADSL connections multiplexed 212 into an own transmission network based e.g. on SDH (Synchronous Digital Hierarchy).

Since a traditional POTS connection or an ISDN connection can also be relayed in an ADSL connection, the access node must be provided both with a unit splitting the POTS part and a unit splitting the ISDN part from the ADSL signal. Reference numbers 25 and 26 indicate these splitters. Splitting is simply based on low pass filtering.

FIG. 4 shows a method of connecting subscriber lines to the node in an access node according to the described state of the art. Subscriber lines SL are connected to the node in groups, which are indicated by references UNIT 1, . . . , UNIT N in the figure. A number of n 2w copper cable subscriber lines is connected to one group, in many cases 16 twin cables (n=16) are connected. Each subscriber line SL is connected to its own subscriber line interface unit, which are presented by the reference term Interface, e.g. subscriber line SL1 of group UNIT I is connected to interface unit 1 (Interface 1). It is easiest in practice that the subscriber lines of each group are of the same type, e.g. the subscriber lines of the group UNIT 1 are POTS subscriber lines, the subscriber lines of the group UNIT 3 are ISDN subscriber lines and the subscriber lines of the group UNIT N are ADSL subscriber lines. This need not necessarily be so, but interfaces of different types may be connected with each group.

Between the end of each subscriber line and the interface unit there is a test switch R, which can be a semiconductor switch or relay and which is used for connecting the subscriber line to a Test Bus or to the subscriber line interface unit. The test unit may control each test relay R individually through the test bus. The subscriber line is normally connected to the interface unit, but when the operator wishes to perform loop measurements on the concerned subscriber line, a command is given by remote control to test unit 211, whereby the test unit will control test relay R in such a way that it will connect the desired subscriber line with the test bus for the time of measurements.

It is a problem with state-of-the-art access nodes of the described kind that always when a subscriber wishes to upgrade his connection type, e.g. a POTS subscriber wishes to have an ISDN connection or an ADSL connection or an ISDN subscriber wants an ADSL connection, an electrician must visit the subscriber to do the required connections. The end of the subscriber line is thereby connected to the new interface. Another consequence of upgrading on the site is that time will pass from the subscriber's request for connection upgrade to the performance of the upgrade, in the best case days, in the worst case weeks, depending on the operator. A method of performing a POTS→ISDN connection on the site is described in Patent Application WO 97/01938.

The problem remains the same, even if the access node is in connection with a local exchange. When an installation job is completed, it is possible that within a short time a new visit must be paid to the access node to upgrade the connection of another subscriber. In state-of-the-art access nodes the electrician's visit is the only way to perform upgrading.

It is an objective of this invention to solve the problem presented above. It is a special objective to perform upgrading of the subscriber connection without any visit by an electrician and almost immediately after the subscriber's request for an upgrading of his connection.

The established objective is solved in the ways defined in the independent claims.

BRIEF SUMMARY OF THE INVENTION

The solution according to the invention consists of two parts: of a bus and of means of connecting the subscriber line to the bus. Firstly, the access node is provided with a special switch matrix bus including several parallel lines, each one of which is a 2-wire line. Interface units of a digital subscriber connection of a first type, here an ISDN connection, and interface units of a digital subscriber connection of a second type, here an ADSL connection, are connected fixedly to the bus, however, in such a way that only one interface unit of a first or second type is connected actively at the same time to one bus line. This connection is made in advance.

The basic element of the second item is a controlled switch element, which may connect the line from the test relay between the subscriber line end and the interface unit to the switch matrix bus instead of the test bus. If several subscriber lines are connected physically to the same card unit so that their test relays are connected to the same line leading to the test bus, then one controlled switch is enough for each group, because the switch element is connected to this common line connecting the test relays with the test bus.

With a remote control signal given by network management that group is chosen which the test relay will connect to the line leading to the test bus of the connected subscriber line. Of course, the subscriber line is the line of that subscriber who wishes to upgrade his connection type. With the same control the controlled switch element is turned so that the signal going to the test bus is connected by it to the switch matrix bus and therein to a predetermined line.

Since the line or twin wire of the switch matrix bus is connected fixedly to an interface unit of a digital subscriber connection (ISDN) of a first type or to an interface unit of a digital subscriber connection (ADSL) of a second type, this means that the subscriber line may be connected through the switch matrix bus to the new interface unit instead of connecting it to the original interface unit. In this way any one but only one subscriber line in the group may be upgraded by remote control to a connection of another type.

Since there are many groups terminating subscriber lines in the access node and there may be tens or hundreds of subscriber lines, the probability of which subscriber wants upgrading of his connection type is divided rather evenly on all subscriber lines. The probability is then rather small that two upgradings of the connection type would have to be done closely in time in the same group. This again means that several subscriber connection upgradings can be done by remote control before the electrician must visit the place to make the permanent connections.

LIST OF FIGURES

The invention will be described more closely with the aid of the appended diagrammatic drawings, wherein FIG. 1 shows a method of connecting subscriber lines to a telephone network;

FIG. 2 shows the structure of an access node;

FIG. 6 shows connections of subscriber lines to interface units supplemented with the addition according to the invention.

DETAILED DESCRIPTION OF THE INVENTION

Figure 3:
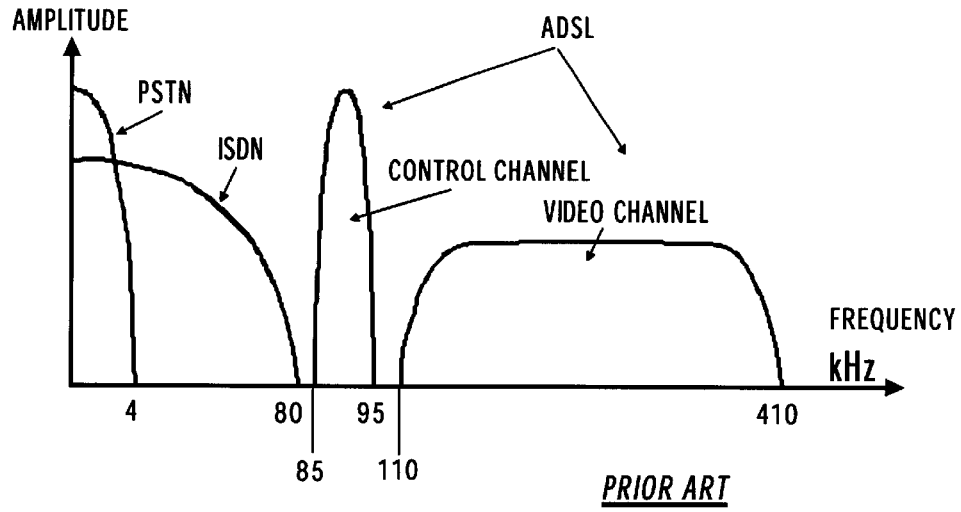
FIG. 3 shows the location of connections of different types on the frequency level.
Figure 5:
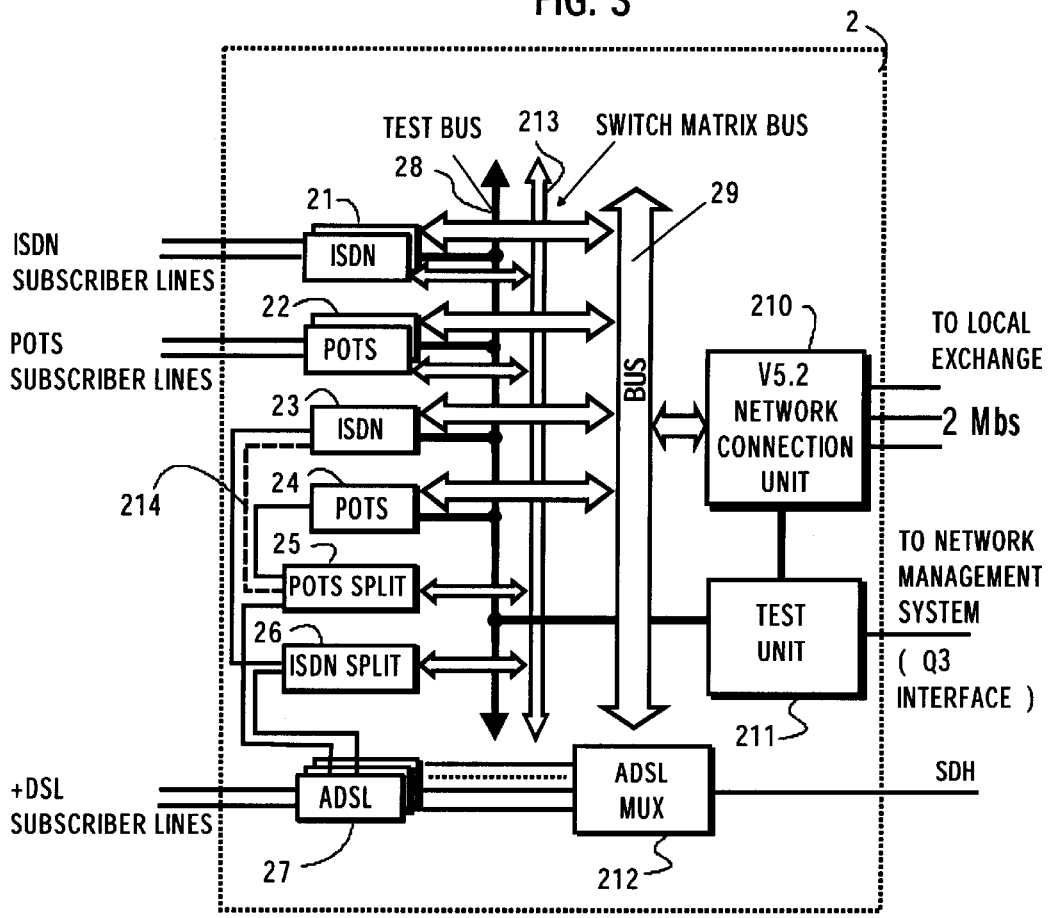
FIG. 5 shows an access node having an addition according to the invention.

FIG. 5 shows a first item, which is a switch matrix bus 213, of the solution according to the invention As can be seen, FIG. 5 differs from FIG. 6 in that it has a switch matrix bus 213. This bus is located as the backplane bus in the frame There is access to the bus from ISDN interfaces 21 and from POTS interfaces 22. In addition, POTS splitter 25 and ISDN splitter 26 are connected to switch matrix bus 213 The switch matrix bus is an analog bus that is, there are no bus clocks.

Although subscriber lines are not connected directly to the additional ISDN and POTS interfaces 23 and 24, the interfaces are nevertheless in connection with bus 29, through which they as well as interfaces 21 and 22 have access to the unit 210 making the network connection and they are further connected by this to the local exchange. These interfaces are needed for adaptation to the network of the audio frequency or ISDN frequency signal of the signal arriving from and going to the ADSL subscriber line.

FIG. 6 shows a better view of the structure of the switch matrix bus. The bus is illustrated in the lower part of the figure. In this example, the bus includes twin wires 1–8. Each bus wire is a twin wire because the subscriber lines are also twin cables and the bus wire forms a part of the subscriber wire, as will be described more closely hereinafter. The switch matrix bus is located in the backplane of the frame as a backplane bus and POTS and ISDN splitters 25 and 26, FIG. 5, are connected to the bus through the connectors of a plug-in unit. The methods of connecting are obvious to professionals and they will not be described here further. Thus each bus wire is connected fixedly either to ISDN splitter 26 or to POTS splitter 25.

The switch matrix bus is preferably made in such a way that the bus wires are connected in turns to a different and to the same splitter. In the figure, bus wire 1 is connected to POTS splitter 25, bus wire 2 is connected to ISDN splitter 26, whereas bus wire 3 is connected to the POTS splitter, and so on. This must not necessarily be so, but connections in practice will be easier, as will emerge later.

It is obvious from the above description and from FIG. 5 that if such a subscriber line signal has reached the bus wire which has an audio or ISDN frequency component, it will reach the splitter (25 or 26), which will separate the audio part from it for further supply to the ISDN or POTS interface 23 or 24. From that point the audio or ISDN signal has further access to bus 29, from which it can be conducted to the local exchange. The splitters separate frequencies exceeding the audio or ISDN signal frequency and conduct them to ADSL interface 27. The second item of the invention will present the manner in which the signal coming from the subscriber line can be directed to the switch matrix bus.

The second item of the invention thus includes a solution of how a subscriber line in use can be connected to the switch matrix bus instead of the interface unit originally connected to it. This solution will be described with the aid of FIG. 6.

Figure 4:
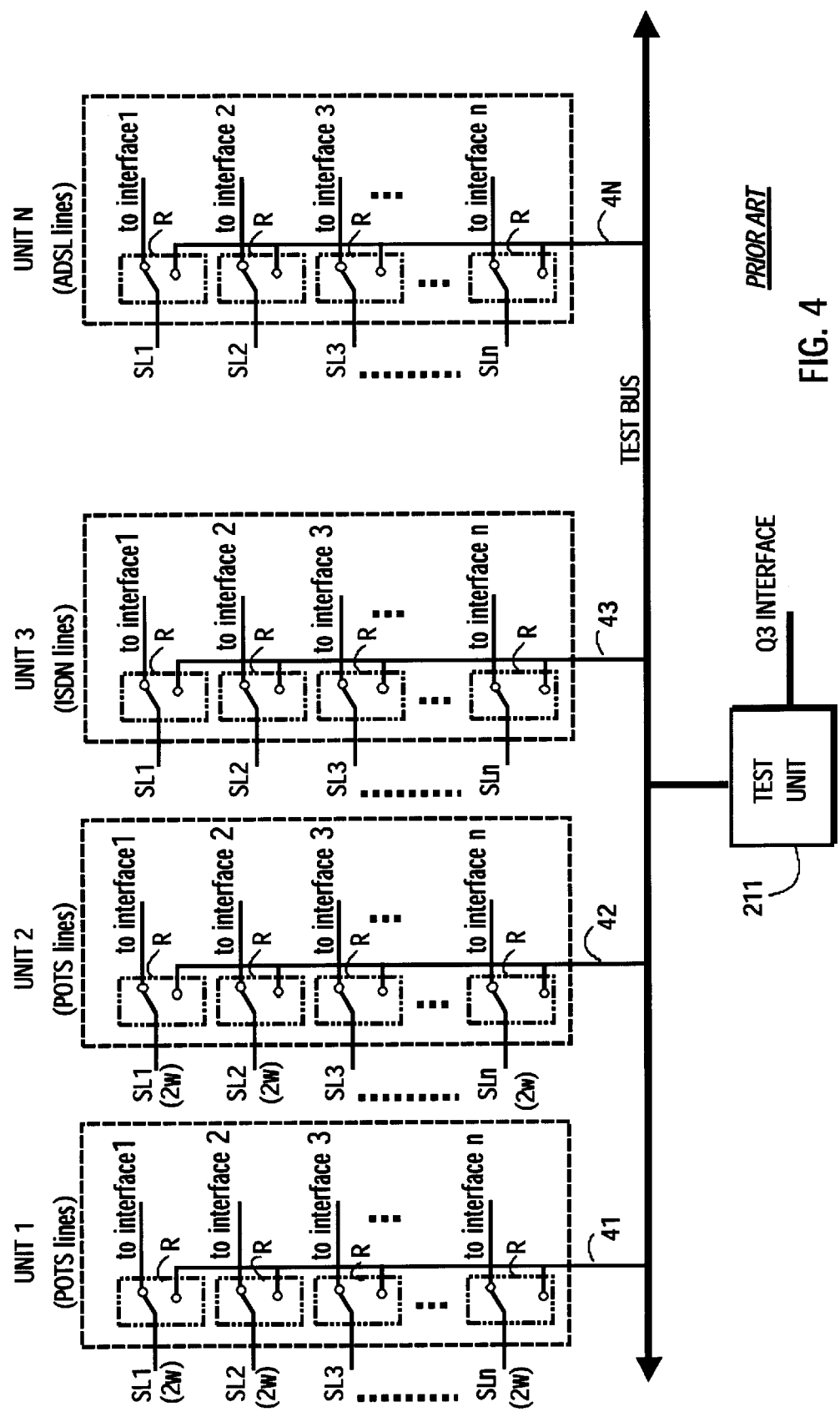
FIG. 4 shows connections of subscriber lines to interface units.

FIG. 6 is similar to FIG. 4 to a considerable degree, differing in the first item of the invention, that is, the switch matrix bus, and in the second item, that is, the means for connecting the subscriber line to the switch matrix bus. Reference numbers and markings are the same in the figures where applicable. The second item is based on the idea of using existing testing means of the subscriber line for connecting the line to the switch matrix bus. It is obvious that each subscriber line SL is connected to a test relay R, with which the subscriber wire can be connected to the test bus instead of the interface unit. The test poles t of test relays R for subscriber lines terminated in the same group are connected to a common line, the other end of which is connected to the test bus.

UNIT 1 will now be studied. Since the groups are identical, the description also applies to the other groups. A switch element is located in common line 41 between the point where it is connected to the test bus and the last relay Rn connected to the common line, and depending on the position of the switch element it will connect the common line 41 either to the test bus or instead to a predetermined wire of the switch matrix bus.

The switch element function can be formed by two relays, whereby the first relay SE1 connects a line 41 which is common to the relays R to another relay SE2. Thus the contact of the first relay is in pole d when it is desired that the common wire 41 is connected to the test bus, and in pole c when a connection of the common wire 41 with the other relay SE2 is desired. It should be noticed that wire 41 is a twin wire, so the relay poles are pairs accordingly.

The second relay SE2 connects the output pole c of the first relay either to pole a or to pole b. Pole a again is connected with one line of the switch matrix bus and pole b with the other line of this bus. In the figure, pole a is connected with line 1, which for its part is connected with the POTS splitter as was described above. Pole b is connected with line 2, which for its part is connected with the ISDN splitter, as was described earlier.

Corresponding connection arrangements are also made in group UNIT 2, but there the common line of the relays may be connected to the following line couple of the switch matrix bus, that is, to lines 3 or 4. Similarly, in group UNIT 3 the common line can be connected to lines 5 or 6 and in group UNIT 4 the common line can be connected to lines 7 or 8. A connection has now been made once to each line of the switch matrix bus and the connection pattern again starts from the beginning for group UNIT 5, that is, a connection is made to lines 1 or 2. When there are many groups, number N, by making a multistage connection of the outputs of relays SE2 of the different groups on the switch matrix bus approximately one connection point is obtained for its individual lines.

How to upgrade a subscriber connection to get another type will be studied in the following. It is assumed that the subscriber is a POTS subscriber. The subscriber's subscriber line is a twin cable SL3 terminating in group UNIT 1. Before upgrading of the connection, subscriber line SL3 is connected to POTS interface 3 when relay R3 is in its normal position. From interface 3, which is on some POTS card 22, FIG. 5, the connection continues through bus 26 to group 210 making the network connection and thence further to the local exchange. When the subscriber has asked the operator to upgrade his present POTS connection to an ADSL connection, the operator will proceed as follows: From a computer in the network management system NMS an upgrading command is given to test unit 211 of the access node, FIG. 5. The test unit switches relay R3 to the test position relay SE1 to position c and relay SE2 to position a, FIG. 6. The outcome is that the subscriber line will be connected through relay R3 and relays SE1 and SE2 to wire 1 of the switch matrix bus. This wire for its part is connected to POTS splitter 25, which belongs to the ADSL modem and which on the one hand is connected with a conventional POTS interface 25 and on the other hand with an ADSL interface, FIG. 5. The POTS subscriber connection has thus been upgraded to an ADSL connection.

Looking from the subscriber, the data produced by the subscriber's terminal equipment is processed in the ADSL modem into an ADSL signal, which propagates along subscriber line SL3 to relay R3 of group UNIT 1, FIG. 6. It prevents access of the signal to POTS interface 3 by directing the signal to the common line 41 of relays R. Relay SE1 directs the signal to relay SE2 which for its part directs the signal to line 1 of the switch matrix bus. From line 1 the ADSL signal propagates to POTS splitter 25, FIG. 5, and thence further to ADSL converter 27. Processed by the converter, the signal is then led multiplexed together with other signals to the SDH network. If the subscriber is talking an ordinary wire call at the same time, it will be separated in POTS splitter 25 and led through POTS interface 24 further to the telephone network.

Data coming to the subscriber from the network is processed in ADSL circuit 27, from which it is led as an ADSL signal through POTS splitter 25, line 1 of the switch matrix bus and relays SE2, SE1 and R3 to subscriber line SL3. If at the same time an analog call arrives for the subscriber, it is directed from bus 29 to POTS interface 24. From there the analog call is directed through line 1 of the switch matrix bus and through relays SE2, SE1 and R3 to subscriber line SL3.

In the manner described above, the POTS subscriber connection has been upgraded by remote control to a POTS+ ADSL connection. However, it should be noticed that the upgrade occupies the line common to the relays, so the type of connection of other subscriber lines coming to this same group can no longer be upgraded by remote control.

Such a case will still be described as an example, where subscriber line SL2 coming to group UNIT 2 is connected to interface 2, which is an ISDN interface. The subscriber has asked the operator to upgrade the connection to an ADSL connection. The data produced by the subscriber's terminal equipment is processed in the ADSL modem into an ADSL signal, which propagates along subscriber line SL2 to relay R2 of group UNIT 2, FIG. 6. It prevents access of the signal to ISDN interface 2 by directing the signal to line 42 which is common to relays R. Relay SE12 directs the signal to relay SE22, which again by way of pole b' directs the signal to line 4 of the switch matrix bus. From line 4 the ADSL signal propagates to ISDN splitter 26, FIG. 5, and thence further to ADSL converter 27. Processed by the converter the signal is then led to the SDH network. If the subscriber talks in an ISDN call at the same time, which call may also be a data call, it is separated in ISDN splitter 26 and it is led through ISDN interface 23 further to the telephone network.

Data coming to the subscriber from the network is processed in ASDL circuit 27, from which it is led as an ADSL signal through ISDN splitter 25, line 4 of the switch matrix bus and relays SE22, SE12 and R2 to subscriber line SL2.

If at the same time an ISDN call arrives for the subscriber from the wire network, the call is directed from bus 29 to ISDN interface 23. Thence the call is directed through line 4 of the switch matrix bus and through relays SE22, SE12 and R2 to subscriber line SL2.

In this way, the ISDN subscriber connection has been upgraded to an ISDN+ADSL connection by remote control. In this case too the upgrade occupies the line common to the relays of group UNIT 2, so the type of connection of other subscriber lines coming to this same group can no longer be upgraded in the manner according to the invention by remote control.

In one group, upgrading can be done of one subscriber connection only. Since there are many groups and several subscriber lines are connected to each group, there is a rather small divided probability of two subscribers who wish upgrading of their connection being connected to the same group. When such a situation occurs, the electrician must pay a visit to the place to connect those connections permanently, which have already been upgraded by remote control. The test lines of groups will become free at the same time, whereby connection upgrading can again be done in the groups by remote control.

The outputs of switch elements of several groups can be connected to one line of the switch matrix bus. However, a barring effect then occurs, because connecting one subscriber line to the said line of the switch matrix bus will prevent connecting of subscriber lines of other groups.

It is also possible to upgrade a POTS connection to an ISDN connection by using the mechanism according to the invention. A connection is then needed from POTS splitter 25 to ISDN card 23. This connection is indicated by a dashed line 214 in FIG. 5. In the light -of the examples presented above it is obvious how the upgrading is done, so it will not be described here.

The basic idea of the invention is simple: the subscriber line is connected to a new bus and not to its proper interface. Through the bus the subscriber line signal is taken to the desired interface. Implementation is performed by using the already existing switching mechanism of subscriber lines to the test bus. Besides the switch matrix bus, new things required are just two switch elements for each card. The price of switch elements is only a fraction of what it costs to have an electrician pay a visit.

Such a case was described above, where subscriber lines are connected to an access node, from which a trunk line is connected to the exchange. The application is in no way limited to this, but the invention may as well be applied to a case where the subscriber lines are brought directly to the exchange.

What is claimed is:

1. Subscriber connection arrangement in a telephone network node, to which several twin-wire subscriber lines lead and through which subscriber terminal equipment has access to the telephone network, the node comprising:

several subscriber interface units of an analog subscriber connection (POTS) and several subscriber interface units of a digital subscriber connection (e.g. ISDN) of a first type, to each of which the end of the subscriber line is connected and which adapt the signal coming from the subscriber line to the telephone network and correspondingly adapt the signal from the telephone network to a signal for transmission on the subscriber line, several test switches, each of which is located between the end of the subscriber line and the subscriber interface unit, a test unit controlling the test switch to connect the end of the subscriber line either with the subscriber interface or with the test bus, through which the test unit performs measurements concerning the subscriber line, whereby the test switches and thus the subscriber lines are arranged in groups so that the test switches of the group may connect the subscriber lines to a common line leading to the test bus, the node further comprising:

a switch matrix bus formed of several wire couples and to several wire couples (1, . . . , 8) of which is connected the subscriber interface (27) of a digital subscriber connection of another type, which interface performs adapting between the telephone network and a signal of another type propagating on the subscriber line, and in each group (UNIT 1, . . . UNIT N), is a controlled switch element (SE1,SE2; SE12,SE22; . . . SE1N, SE2N) located on a common line (41, . . . 4N) between the test switches (R1, . . . ,RNn) of the group, which switch element connects the common line to one predetermined wire couple of the switch matrix bus or to the test bus.

2. Subscriber connection arrangement as defined in claim 1, wherein when upgrading the type of connection of a subscriber line (e.g. SL3), a test relay (R3) located between the subscriber line and the connected subscriber interface is used for connecting the subscriber line to the common line (41) of the group and a controlled switch element (SE1, SE2) is used for connecting the common line to one line of the switch matrix bus instead of the test bus, whereby the subscriber line (SL3) is connected through the switch matrix bus to the interface of a digital subscriber connection of another type.

3. Subscriber connection arrangement as defined in claim 1, wherein the subscriber interface (27) of the digital subscriber connection of another type is an Asymmetric Digital Subscriber Line (ADSL).

4. Subscriber connection arrangement as defined in claim 3, wherein the ADLS is connected to the switch matrix bus through a first POTS splitter 25 and a second ISDN splitter 26, which separate from the signal coming from the subscriber line those signal frequencies of the analog subscriber connection (POTS) or of the digital subscriber connection (ISDN) of the first type which are lower than the ADSL signal frequencies and which lead them to their own interfaces (23 or 24) but admit the ADSL signal frequencies to the ADSL interface (27).

5. Subscriber connection arrangement as defined in claim 1, wherein some bus wires are connected fixedly to subscriber interfaces of the digital subscriber connection (e.g. ISDN) of the first type, the analog subscriber connection (POTS) is upgraded to a digital subscriber connection of the first type by using a test relay (R3) located between the subscriber line (SL) and the connected subscriber interface for connecting the subscriber line to the line (41) common to the group and by using the controlled switch element (SE1, SE2) for connecting the common line not to the test bus but to that line of the switch matrix bus which is connected fixedly to subscriber interfaces of the digital subscriber connection (ISDN) of the first type.

6. Subscriber connection arrangement as defined in claim 4, wherein the wires of the switch matrix bus are connected fixedly by turns to the first and second splitters (POTS Splitter 25, Splitter 26) and the controlled switch element (SE1,SE2; SE12,SE22; . . . SE1N,SE2N) may connect the common line (41, . . . 4N) and thus the subscriber line either to a wire of the switch matrix bus, which is connected fixedly to the first splitter (POTS Splitter 25), or to a wire of the switch matrix bus, which is connected fixedly to the second splitter (ISDN Splitter 26).

7. Subscriber connection arrangement as defined in claim 2, wherein upgrading of the type of subscriber connection of the subscriber line is performed by remote control through the network management system of the telephone network.

8. Subscriber connection arrangement as defined in claim 7, wherein the test unit performs upgrading of the type of subscriber connection in response to a command arriving from the network management system of the telephone network.

9. Subscriber connection arrangement as defined in claim 1, wherein the controlled switch element includes two relays, of which the first relay (SE1) connects the common line (41) from the test switches (R) to the second relay (SE2) instead of the test bus, and the second relay connects the common line further alternatively to one of two lines of the switch matrix bus.

10. Subscriber connection arrangement as defined in claim 4, wherein one of the lines of the switch matrix bus is connected fixedly to the first splitter (POTS Splitter 25), whereby an analog subscriber connection may be upgraded to an ADSL connection and the other line of the switch matrix bus is connected fixedly to the second splitter (ISDN Splitter 24), whereby an ISDN subscriber connection can be upgraded to an ADSL connection.

* * * * *